(12) United States Patent
Goetz

(10) Patent No.: US 8,763,023 B1
(45) Date of Patent: Jun. 24, 2014

(54) DETERMINING IMPORTANCE OF SCENES BASED UPON CLOSED CAPTIONING DATA

(71) Applicant: Amazon Technologies, Inc., Reno, NV (US)

(72) Inventor: Jeromey Russell Goetz, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/789,718

(22) Filed: Mar. 8, 2013

(51) Int. Cl.
*H04H 60/32* (2008.01)

(52) U.S. Cl.
USPC ............................................. 725/20; 725/44

(58) Field of Classification Search
USPC ......................................... 725/19–20, 44–47
See application file for complete search history.

(56) References Cited

U.S. PATENT DOCUMENTS

| | | | |
|---|---|---|---|
| 6,295,092 B1 * | 9/2001 | Hullinger et al. | 348/468 |
| 7,506,356 B2 * | 3/2009 | Gupta et al. | 725/116 |
| 8,352,985 B2 * | 1/2013 | Ryu et al. | 725/47 |
| 8,424,052 B2 * | 4/2013 | Abed | 725/136 |
| 8,631,436 B2 * | 1/2014 | Arrasvuori et al. | 725/45 |

OTHER PUBLICATIONS

Copending U.S. Appl. No. 13/540,149, filed Jul. 2, 2012 and entitled "Extracting Topics from Customer Review Search Queries." (copy not provided).

* cited by examiner

*Primary Examiner* — Hunter B Lonsberry
(74) *Attorney, Agent, or Firm* — Thomas | Horstemeyer, LLP

(57) ABSTRACT

Disclosed are various embodiments for identifying importance of scenes or moments in video content relative to one another. Closed captioning data is extracted from a video content feature. A textual analysis of the closed captioning data is performed. The importance level of scenes can be ranked with respect to one another.

24 Claims, 7 Drawing Sheets

100

DETERMINING IMPORTANCE OF SCENES BASED UPON CLOSED CAPTIONING DATA

BACKGROUND

Certain portions of a movie or other media content may be more important or pivotal than other portions. For example, a movie may have a particularly important scene with respect to the plot of the movie. Likewise, an episode of a television series may have a particular scene with importance with respect to the remaining portions of the episode. Users may wish to view important scenes of a movie or other media content more than other scenes.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Embodiments of the present disclosure are related to identifying important scenes, or an importance level of scenes, that are contained within a video content feature. Embodiments of the present disclosure are also related to identifying important moments within a video content feature, where a moment can comprise less than an entire scene. A video content feature can include a movie, a television program, or any content that is associated with closed captioning data. Closed captioning data includes text of dialog, non-dialog spoken content (narration, song lyrics, etc.) as well as unspoken content (text indication of noises or sounds, punctuation, etc.). Video content features are often segmented into chapters. Chapter data, however, often fails to indicate importance of scenes relative to one another. Oftentimes, chapter data merely segments a video content feature into relatively equal sections without regard to scenes or their importance relative to one another.

Accordingly, embodiments of the present disclosure identify the importance of scenes and/or moments with a video content feature based at least in part upon a textual analysis of closed captioning data. In many cases, such an analysis can consider information that is external to the closed captioning data. The textual analysis may also include determination of important scenes or moments within a video content feature using a data model. Such a data model can be updated and/or trained via user feedback.

Figure 1:
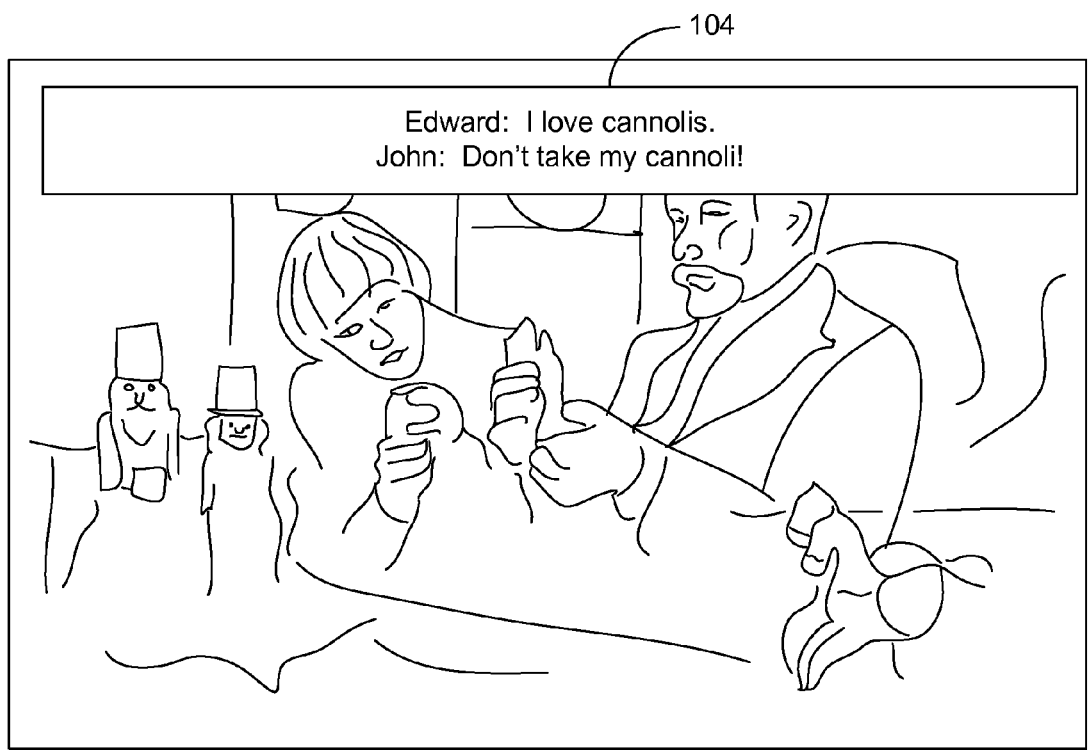
FIG. 1 is a drawing of a video content feature including closed captioning data according to various embodiments of the present disclosure.

Turning now to FIG. 1, shown is a video content feature 100 according to various embodiments. The video content feature 100 is associated with closed captioning data 104 that includes dialog occurring within the video content feature 100. Closed captioning data 104 is often time coded so that a television, set-top box, computing device, or other system can determine when certain text should be rendered on a display or user interface. Accordingly, because closed captioning data 104 can be associated with particular moments within the video content feature using time coding information, embodiments of the disclosure can identify an importance level of various scenes within a video content feature relative to other scenes. In other words, the importance level of scenes of the video content feature can be ranked according to their importance based upon an analysis of content from the closed captioning data. In the following discussion, a general description of the system and its components is provided, followed by a discussion of the operation of the same.

Figure 2:
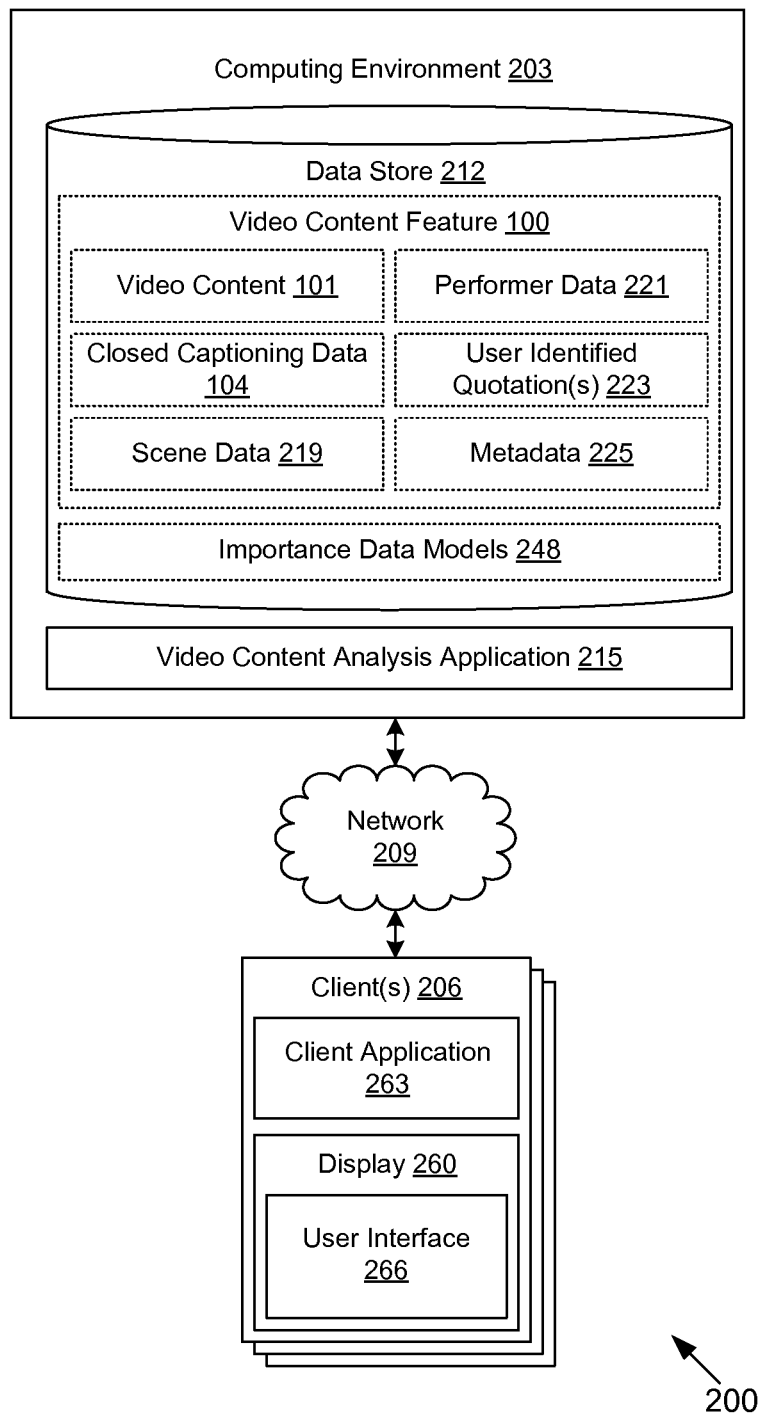
FIG. 2 is a drawing of a networked environment according to various embodiments of the present disclosure.

With reference to FIG. 2, shown is a networked environment 200 according to various embodiments. The networked environment 200 includes a computing environment 203 and one or more clients 206 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a video content analysis application 215, and other applications, services, processes, systems, engines, or functionality not discussed in detail herein. The video content analysis application 215 is executed to perform a textual analysis of closed captioning data, identify potentially important portions of the closed captioning data with regard, and relate these important portions to particular scenes or moments from a video content feature 100.

The data stored in the data store 212 includes, for example, video content features 100. A video content feature 100 can include, for example, a movie, television program, or other content that can be accompanied by closed captioning data 104. Each video content feature 100 is associated with video content 101, which includes video and/or audio that is rendered by a client device on a display with the video content 101 is consumed. A video content feature 100 is also associated with closed captioning data 104, which includes text that is associated with dialog occurring within the video content feature, non-dialog spoken content and/or non-spoken content that may be included to assist understanding of the video content feature 100 when it is consumed without sound. Closed captioning data 104, as noted above, can also be time coded so that a device that is rendered the video content feature 100 can determine when to render specific text from the closed captioning data 104.

A video content feature 100 also includes scene data 219, performer data 221, user identified quotations 223, metadata 225, and potentially other data. The scene data 219 describes various scenes into which the video content feature 100 may be divided. A scene corresponds to a period of time in the video content feature 100 having multiple video frames, and may be determined as having a distinct plot element or setting. In one embodiment, a scene is defined as having a beginning video frame and an ending video frame. In another embodiment, a scene is defined as having a beginning video frame and a duration. The scene data 219 may be generated automatically by employing scene break detection mechanisms, or the scene data 219 may be user curated such that one or more users can provide or define time codes at which scene breaks occur. A moment corresponds to a period of time in the video content feature 100 having multiple video frames that is within a scene. In other words, a moment corresponds to a shorter period of time from within the video content feature relative to a scene. In the context of the present disclosure, it should be appreciated that important moments of a video content feature can also be detected similar to the way in which the importance level of scenes is assessed because close captioning data is time coded such that moments can be identified.

The scene data 219 can also include an importance level of each of the scenes as determined by the video content analysis application 215. In other words, the scene data 219 can include a ranking of the scenes of a video content feature 100 according to the importance level as determined by video content analysis application 215 and/or by one or more users. For example, the video content analysis application 215 can rank the scenes of a video content feature 100 by an importance level or store a numerical value associated with a calculated importance level of scenes of a video content feature 100, which can be stored in the scene data 219. The video content analysis application 215 can override the ranking of scenes according to an importance level in response to user feedback (e.g., administrative user override, voting of a population of users on the accuracy of importance level detection) and update the importance level of scenes in the scene data 219. Systems and methods for identifying important text, or "topics," from within a larger corpus of text are disclosed in U.S. patent application Ser. No. 13/540,149, filed Jul. 2, 2012 and entitled "Extracting Topics from Customer Review Search Queries," which is hereby incorporated herein by reference in its entirety. Accordingly, systems and methods for identifying important text or the importance level of text relative to other text can be accomplished as described therein.

The performer data 221 describes various actors, actresses, extras, etc. who appear in one or more of the video content features 100. The performer data 221 may identify performers according to prominence. For example, a starring performer, or hero/heroine, may be identified by a character name. Other performers or characters may also be identified by character name within the performer data 221. Accordingly, dialog contained within closed captioning data 104 can be related to performers appearing within the video content feature 100 because closed captioning data 104 may sometimes identify a character who is speaking at various points in time within the video content feature 100.

The data store 212 also includes user identified quotations 223 that are associated with the video content feature 100. User identified quotations 223 can identify portions of dialog from a video content feature 100 that are memorable, notable and/or important in some way. For example, the user identified quotations 223 can be obtained from a user curated network site that publishes information, images, reviews, or other data about movies, televisions shows, or other content. Accordingly, editorial users or consumer users may identify portions of dialog from a particular video content feature 100 as important, pivotal, or memorable in some way. Video content features 100 can also be associated with metadata 225, which can include any other information about a video content feature 100, such as, production information, plot synopses, user reviews, imagery associated with a video content feature 100, or any other information.

The importance data models 248 may be employed for machine learning purposes. For example, the importance data models 248 may be trained through manual confirmation of correct identification of important scenes within video content features 100. For example, the important scenes that are detected or ranked by the video content analysis application 215 can be confirmed or overridden by one or more users (e.g., voting obtained from multiple users). Where correct detections are confirmed, the text appearing within the scenes or other information relied upon to designate given scenes are important relative to other scenes in a video content feature 100 may be employed in the importance data models 248 to improve the accuracy of further determinations about the importance level of scenes from other video content features 100.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 260. The display 260 may comprise, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as a manual review client application 263 and/or other applications. The manual review client application 263 may be executed to facilitate completing a task that is a part of a manual review of detection of important scenes, or ranking of scenes by importance level, by the video content analysis application 215. The manual review client application 263 may be executed in a client 206, for example, to access network content served up by the computing environment 203 and/or other servers, thereby rendering a user interface 266 on the display 260. The manual review client application 263 may, for example, correspond to a browser, a mobile application, etc., and the user interface 266 may correspond to a network page, a mobile application screen, etc. The client 206 may be configured to execute applications beyond the manual review client application 263 such as, for example, video content player applications, browsers, mobile applications, email applications, social networking applications, and/or other applications. Although the manual review client application 263 is described as being executed in a client 206, in some embodiments, the manual review client application 263 may be executed in the same system as the video content analysis application 215 or other components described herein.

Next, a general description of the operation of the various components of the networked environment 200 is provided. To begin, as noted above, the video content analysis application 215 can identify an importance level of scenes within a video content feature 100 based at least in part upon an analysis of closed captioning data 104 that accompanies the video content feature 100. The video content analysis application 215 rank scenes within a video content feature 100 according to an importance level in various ways, many of which may be combined so that the video content analysis application 215 can generate a ranking of scenes along with a confidence score that expresses a confidence in a correct determination of importance.

As one example, the video content analysis application 215 can identify a plurality of scenes within a video content feature 100 by employing scene change detection or by consulting scene data 219 in which time codes corresponding to scene changes have been obtained from some other source. The video content analysis application 215 can then compare a volume of words within the closed captioning data 104 that corresponds to the various scenes within the video content feature 100 and rank scenes containing more dialog as more important than another scene containing less dialog.

As another example, the video content analysis application 215 can examine the text contained with the closed captioning data 104 corresponding to the various scenes of a video content feature 100 and perform a sentiment analysis on text corresponding to the various scenes to assess the importance of scenes relative to one another. For example, a first scene containing text that, upon conducting a sentiment analysis, contains content that evokes a greater degree of emotion relative to another scene can be categorized as more important than the other scene.

As yet another example, the video content analysis application 215 can identify whether scenes within a video content feature 100 contain text that corresponds to user identified quotations 223 associated with the video content feature 100. As described above, user identified quotations 223 are quotations of dialog from the video content feature 100 that users have identified as being important or otherwise memorable. Accordingly, the video content analysis application 215 can identify text that corresponds to or shares a threshold number of words with these user identified quotations 223 and designate scenes corresponding to these user identified quotations 223 as more important than scenes in which a user identified quotation 223 does not appear. In some embodiments, the user identified quotations 223 can comprise an ordered list of quotations that are ranked according to importance. Accordingly, the video content analysis application 215 can rank a scene containing a more important user identified quotation 223 as having a higher importance level relative to another scene having a less important user identified quotation 223.

The video content analysis application 215 can also access metadata 225, such as a synopsis, that is associated with the video content feature 100. The video content analysis application 215 performs a textual analysis to identify important portions of the synopsis of the video content feature 100. Then, the video content analysis application 215 can identify text in the closed captioning data 104 that corresponds to important portions of the video content feature 100. Scenes corresponding to the identified text can be assigned a higher importance level relative to other scenes in the video content feature 100.

The video content analysis application 215 can also identify text within the closed captioning data 104 that corresponds to non-dialog spoken content. For example, non-dialog spoken content can include narration, singing, or other non-dialog content. Such content is often indicated via a leading character, such as an open bracket, and a terminating character, such as a closed bracket. Narration, in some cases, is indicated with the word "narration" or other indicator text as can be appreciated. Accordingly, narration may indicate or introduce a scene within a video content feature 100 that can be viewed as important or pivotal. Therefore, when text in the closed captioning data 104 corresponds to non-dialog spoken content that is narration, the video content analysis application 215 can increase the importance level of the scene. In some embodiments, the video content analysis application 215 can be configured to decrease the importance level of the scene when the corresponding closed captioning data 104 contains narration.

As another example, the video content analysis application 215 can also identify text in the closed captioning data 104 that corresponds to unspoken content, such as music, noises (e.g., explosions, verbal utterances that are not words), or other unspoken content. Accordingly, the video content analysis application 215 can first detect text can corresponds to unspoken content. In many cases, unspoken content in closed captioning data 104 is preceded by a leading character or some form of markup language that indicates that subsequent text corresponds to unspoken content. Additionally, closed captioning data 104 often includes a termination character that indicates the end of unspoken content.

Therefore, the video content analysis application 215 can determine whether the unspoken content corresponds to a keyword that indicates a potential important scene within a video content feature 100. For example, if the video content analysis application 215 detects a keyword such as "explosion" or "bang" within the closed captioning data 104, the video content analysis application 215 may designate a corresponding scene as more important than other scenes based upon the existence of these keywords.

As another example, the video content analysis application 215 can also identify the prominence of performers within a video content feature 100 and designate scenes in which more prominent performers have dialog as more important than scenes in which lesser prominent performers have dialog. For example, the performer data 221 may rank performers according to prominence. Dialog in closed captioning data 104 is often accompanied by text that indicates the performer (e.g., by character name) who is speaking. Accordingly, the video content analysis application 215 can detect which performer is speaking from the closed captioning data 104 and determine an importance level of the scene relative to other scenes based upon the prominence of the performer in the video content feature 100.

The video content analysis application 215 can also take into account information that is external to closed captioning data 104. For example, closed captioning data 104 may indicate the titles of songs that are playing within a video content feature 100. Accordingly, the video content analysis application 215 can assess the importance level of a scene within a video content feature 100 based at least in part upon the popularity of a song playing with the video content feature 100. For example, if a first scene is associated with a song that is more popular than a song from another scene, then the first scene can be designated as a more important scene relative to the other scene. Popularity can be judged based upon sales of a song, album, or associated artist within an electronic commerce system, music sales charting service, etc., The above considerations for assessing the importance level of scenes of a video content feature 100 can be employed in one or more importance data model 248, which can define parameters associated with the various considerations outlined above and perform automated detection of an importance level of scenes within various video content features 100. Additionally, the video content analysis application 215 can also present user interfaces to various clients 206 so that the detection of important scenes and/or ranking of scenes of a video content feature 100 by their importance can be manually verified by users. In one embodiment, manual verification can be accomplished by presenting voting elements in a user interface 266 to various users and then collecting votes regarding whether the video content analysis application 215 has accurately assessed and/or ranked the importance of scenes of a video content feature 100. The votes obtained by the video content analysis application 215 can be used to train and/or update the importance data models 248 that guide automated detection or importance scenes and/or ranking of scenes by their importance level.

Figure 3:
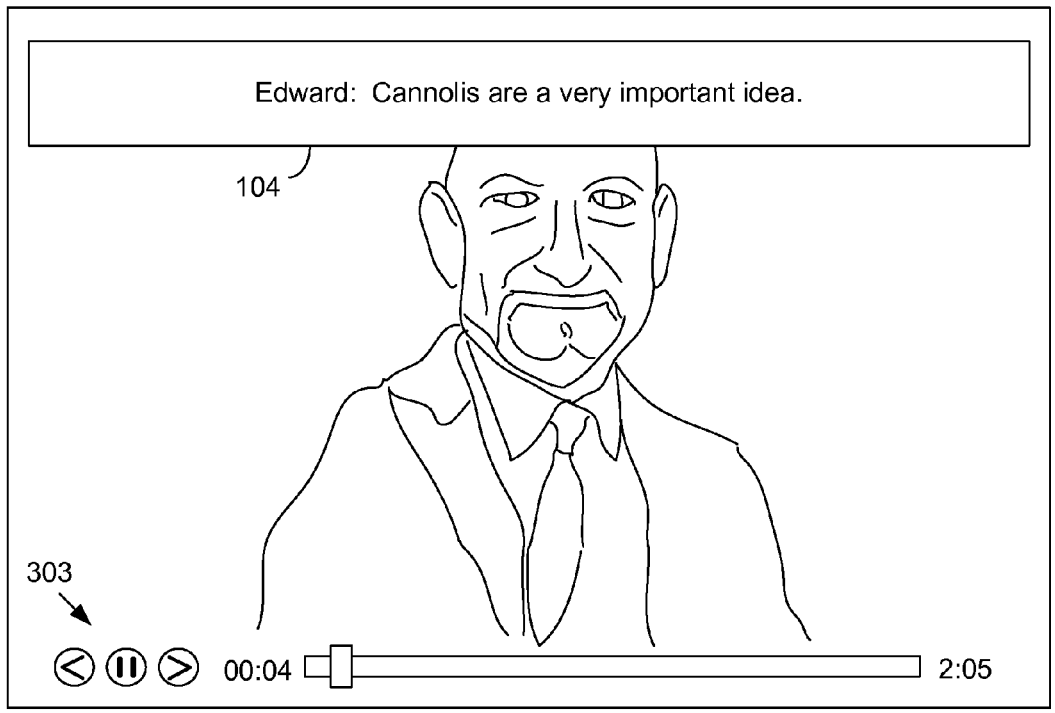
FIG. 3 is a drawing of an example of a user interface rendered by a client in the networked environment of FIG. 1 according to various embodiments of the present disclosure.

Referring next to FIG. 3, shown is one example of a user interface 266 rendered by a client 206 (FIG. 2) in the networked environment 200 (FIG. 2) according to embodiments of the present disclosure. The user interface 266 shows a portion of a video content feature 100 that is currently being displayed as well as various media controls 303.

Figure 4:
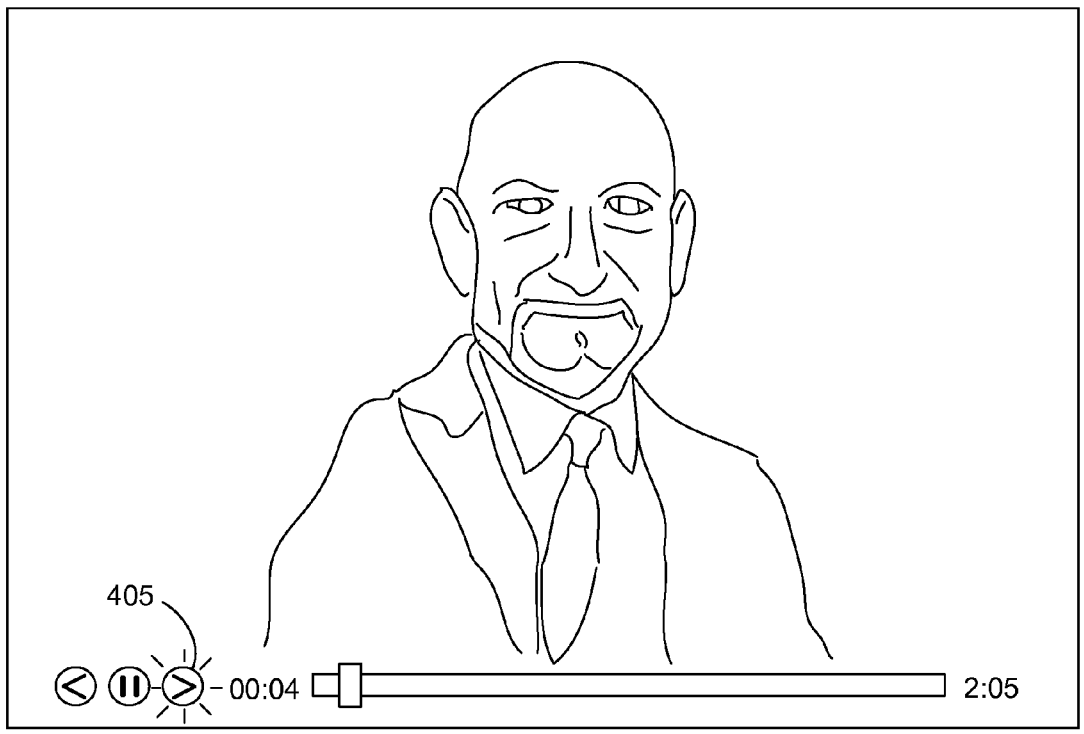
FIG. 4 is a drawing of an example of a user interface rendered by a client in the networked environment of FIG. 1 according to various embodiments of the present disclosure.
Figure 5:
FIG. 5 is a drawing of an example of a user interface rendered by a client in the networked environment of FIG. 1 according to various embodiments of the present disclosure.

FIGS. 3-5 illustrate one potential application of identification of important scenes and/or ranking of scenes according to an importance level by the video content analysis application 215. In the example shown in FIG. 3, the video content analysis application 215 can identify a scene corresponding to the video content feature 100 shown in the depicted user interface 266 as an important scene based upon a textual analysis of the closed captioning data 104 that accompanies the video content feature 100 by employing the various factors that are described above. Accordingly, the identity of important scenes can be used to facilitate navigation and/or playback of a video content feature. In one example, when a user manipulates a fast-forward, seek, or "next chapter" media control 303, the playback software rendering the video content feature 100 can be configured to advance to the next scene that was identified as an important scene (e.g., a scene whose importance level exceeds a threshold) in the video content feature 100.

As another example, if the user drags a slider bar that is configured to facilitate random access into a particular point in time in a video content feature 100, the slider bar can be configured with a bias to important scenes within the video content feature. In other words, if a user manipulates such a slider bar media control 303, the slider bar is more likely to cause playback to resume from an important scene within the video content feature 100. Accordingly, reference is now made to FIG. 4, which continues the example of FIG. 3.

In the scenario illustrated in FIG. 4, a user can activate a media control 303 element that causes the playback software rendering the video content feature 100 to advance playback to the next important scene. For example, when a user activates the "next chapter" button 405, the playback software can advance to a next scene within the video content feature 100 as defined by the scene data 219 having an importance level that exceeds a threshold, where the importance level is determined via a textual analysis by the video content analysis application 215. Continuing the example shown in FIG. 4, reference is now made to FIG. 5. As shown in FIG. 5, the playback software rendering the video content feature 100 can advance to a next scene having an importance level that exceeds a predefined threshold.

Figure 6:
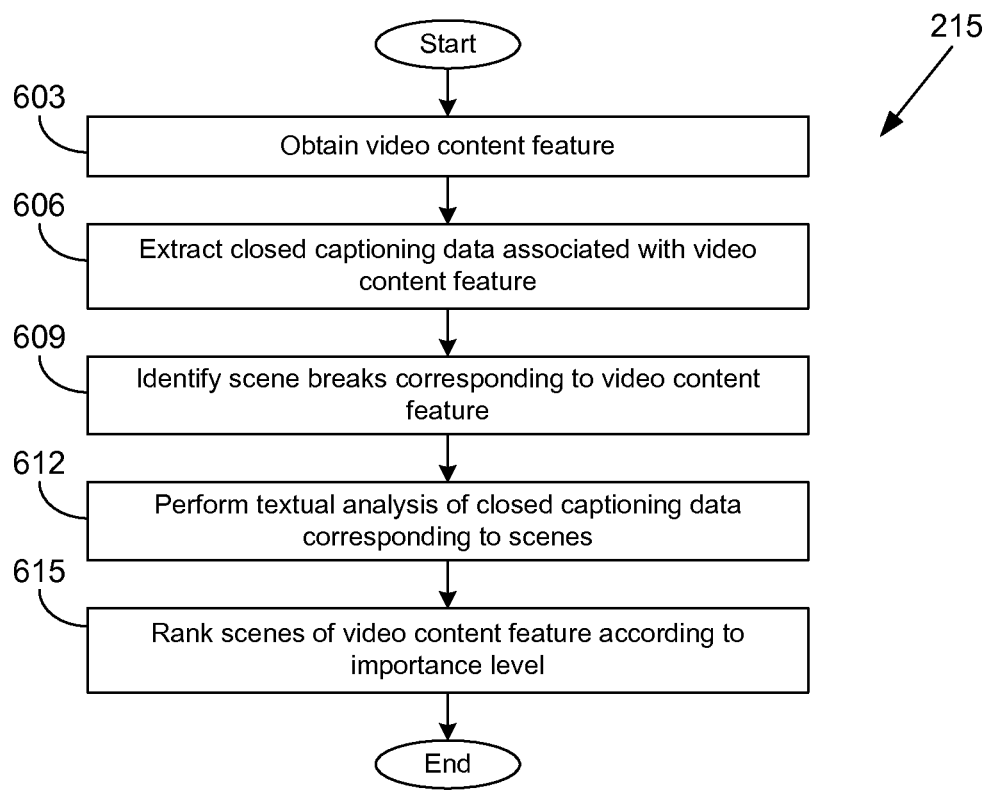
FIG. 6 is a flowchart illustrating one example of functionality implemented as portions of a video content analysis application executed in a computing environment in the networked environment of FIG. 1 according to various embodiments of the present disclosure.

Referring next to FIG. 6, shown is a flowchart that provides one example of the operation of a portion of the video content analysis application 215 according to various embodiments. It is understood that the flowchart of FIG. 6 provides merely an example of the many different types of functional arrangements that may be employed to implement the operation of the portion of the video content analysis application 215 as described herein. As an alternative, the flowchart of FIG. 6 may be viewed as depicting an example of steps of a method implemented in the computing environment 203 (FIG. 2) according to one or more embodiments.

Beginning with box 603, the video content analysis application 215 obtains a video content feature 100 (FIG. 1). In box 606, the video content analysis application 215 extracts closed captioning data 104 (FIG. 1) from the video content feature 100. In other words, the video content analysis application 215 obtains closed captioning data 104 that accompanies the video content feature 100. In box 609, the video content analysis application 215 identifies scene breaks in a video content feature 100. As noted above, the video content analysis application 215 can identify scene breaks by performing scene break detection. In some embodiments, the scene breaks can be provided as time coded data within the scene data 219 corresponding to the video content feature.

Additionally, embodiments of the disclosure, instead of dividing a video content feature by scene, can also identify important moments within the video content feature. A moment corresponds to a period of time in the video content feature 100 having multiple video frames that is within a scene. In other words, a moment corresponds to a shorter period of time from within the video content feature relative to a scene. In the context of the present disclosure, it should be appreciated that important moments of a video content feature can also be detected similar to the way in which the importance level of scenes is assessed because close captioning data is time coded such that moments can be identified.

In box 612, the video content analysis application 215 performs a textual analysis of the closed captioning data 104 to identify the importance level of scenes relative to one another. In box 615, the video content analysis application 215 can rank the scenes within a video content feature according to their importance based upon the closed captioning data 104, as described above. In some embodiments, ranking of scenes with respect to their importance level can comprise assigning a score that is related to the importance of each scene relative to other scenes within the video content feature 100. Thereafter, the process shown in FIG. 6 ends.

Figure 7:
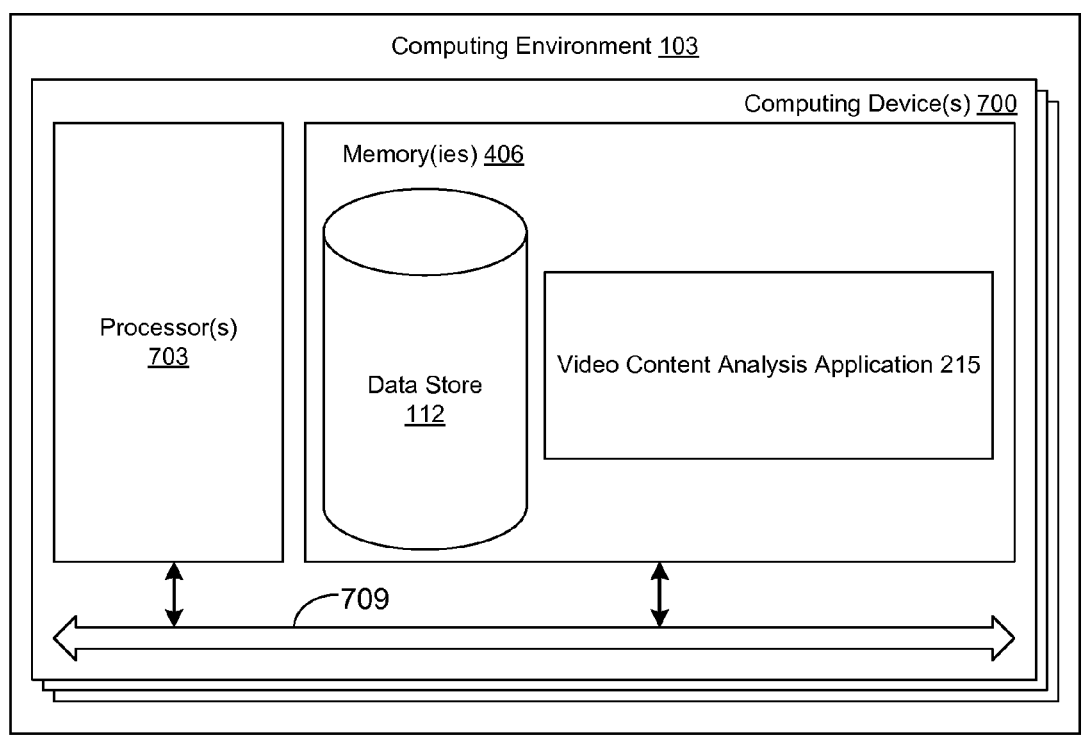
FIG. 7 is a schematic block diagram that provides one example illustration of a computing environment employed in the networked environment of FIG. 1 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the video content analysis application 215 and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the video content analysis application 215 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 6 shows the functionality and operation of an implementation of portions of the video content analysis application 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including video content analysis application 215, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:
    code that obtains a video content feature, the video content feature associated with closed captioning data;
    code that performs an analysis of spoken dialog in the closed captioning data in a plurality of scenes of the video content feature;
    code that performs an analysis of non-dialog spoken content in the closed captioning data in the plurality of scenes of the video content feature;
    code that performs an analysis of text in the closed captioning data that is associated with unspoken content in the video content feature; and
    code that ranks a plurality of scenes of the video content feature according to an importance level, the importance level of a scene based at least in part upon the analyses of the spoken dialog, the non-dialog spoken content and the unspoken content.

2. The non-transitory computer-readable medium of claim 1, wherein the analysis of the spoken dialog further comprises:
    code that determines whether a portion of the spoken dialog contains dialog identified by a user in a video information site as being associated with an important scene; and
    code that modifies the importance level of a scene corresponding to the portion of the spoken dialog.

3. The non-transitory computer-readable medium of claim 1, wherein the analysis of the non-dialog spoken content further comprises:
    code that determines whether the a portion of the non-dialog spoken content corresponds to narration; and
    code that modifies the importance level of a scene corresponding to the portion of the non-dialog spoken content.

4. A system, comprising:
    at least one computing device; and
    a video content analysis application executable in the at least one computing device, the video content analysis application comprising:
        logic that extracts closed captioning data from a video content feature;
        logic that identifies a plurality of scenes in the video content feature;
        logic that performs a textual analysis on the closed captioning data; and
        logic that ranks an importance level of the plurality of scenes based at least in part upon the textual analysis of the closed captioning data.

5. The system of claim 4, wherein the logic that identifies a plurality of scenes in the video content feature further comprises logic that performs scene change detection within the video content feature.

6. The system of claim 4, wherein the ranks the importance level of the plurality of scenes based at least in part upon the textual analysis of the closed captioning data further comprises logic that ranks the plurality of scenes based at least in part upon a volume of dialog occurring within each of the plurality of scenes.

7. The system of claim 4, wherein the logic that performs the textual analysis on the closed captioning data further comprises:
    logic that identifies text corresponding to a portion of dialog from the video content feature as being associated with an important scene from the video content feature;
    logic that identifies the text corresponding to a portion of dialog from the video content feature in the closed captioning data; and
    logic that modifies the importance level of a scene corresponding to the portion of dialog from the video content feature.

8. The system of claim 7, wherein the logic that identifies text corresponding to a portion of dialog from the video content feature as being associated with the important scene further comprises logic that determines whether the text corresponds to at least one of a plurality user identified quotations associated with the video content feature from a data store in communication with the at least one computing device.

9. The system of claim 7, wherein the logic that identifies text corresponding to a portion of dialog from the video content feature as being associated with an important scene further comprises logic that performs a sentiment analysis on the closed captioning data.

10. The system of claim 4, wherein the logic that performs the textual analysis on the closed captioning data further comprises:
    logic that retrieves a synopsis associated with the video content feature from a data store in communication with the at least one computing device;
    logic that identifies text from the synopsis in the closed captioning data; and
    logic that modifies the importance level of a scene corresponding to the text from the synopsis in the closed captioning data.

11. The system of claim 7, wherein the logic that performs the textual analysis on the closed captioning data further comprises:
    logic that ranks a plurality of performers appearing within the video content feature according to prominence;
    logic that identifies at least one respective scene containing a highest ranked performer;
    logic that modifies the importance level of the at least one respective scene including the highest ranked performer.

12. The system of claim 11, wherein the logic that identifies at least one respective scene containing a highest ranked performer further comprises logic that identifies a name of a character of the performer within the closed captioning data.

13. The system of claim 11, wherein the logic that ranks the plurality of performers appearing within the video content feature according to prominence further comprises logic that ranks the plurality of performers based at least in part upon an amount of dialog in the closed captioning data that is attributable to each of the respective performers.

14. The system of claim 11, wherein the logic that ranks the plurality of performers appearing within the video content feature according to prominence further comprises logic that queries an external network site containing information about the plurality of performers appearing within video content feature.

15. The system of claim 4, wherein the logic that ranks the importance level of the plurality of scenes based at least in part upon the textual analysis of the closed captioning data further comprises logic that tags the video content feature according to the ranking.

16. A method, comprising:
obtaining, by at least one computing device, a video content feature associated with closed captioning data;
extracting, by the at least one computing device, the closed captioning data from the video content feature; and
identifying, by the at least one computing device, an importance level of a plurality of moments from within the video content feature based at least in part upon an analysis of the closed captioning data.

17. The method of claim 16, wherein identifying the importance level of the plurality of moments from within the video content feature further comprises:
identifying, by the at least one computing device, non-dialog spoken content in the closed captioning data;
identifying, by the at least one computing device, a moment corresponding to the non-dialog spoken content; and
modifying, by the at least one computing device, the importance level of the moment corresponding to the non-dialog spoken content.

18. The method of claim 16, wherein identifying the importance level of the plurality of moments from within the video content feature further comprises:
identifying, by the at least one computing device, at least one character within the closed captioning data that corresponds to narration;
identifying, by the at least one computing device, a moment within the video content feature corresponding to the narration; and
modifying, by the at least one computing device, an importance level of the moment corresponding to the narration.

19. The method of claim 16, wherein identifying the importance level of the plurality of moments from within the video content feature further comprises:
identifying, by the at least one computing device, non-spoken content within the closed captioning data;
determining, by the at least one computing device, whether the non-spoken content corresponds to a keyword; and
modifying, by the at least one computing device, an importance level of the moment corresponding to the non-spoken content.

20. The method of claim 19, wherein identifying the non-spoken content within the closed captioning data further comprises:
identifying a leading character indicating a beginning of non-spoken content within the closed captioning data; and
identifying a termination character indicating an ending of non-spoken content within the closed captioning data.

21. The method of claim 19, wherein the keyword is designated as indicative of an important scene within the video content feature.

22. The method of claim 16, wherein identifying the importance level of the plurality of moments from within the video content feature further comprises:
identifying, by the at least one computing device, an indication of music within the closed captioning data; and
modifying, by the at least one computing device, the importance level of the moment based at least in part upon the indication of music within the closed captioning data.

23. The method of claim 22, further comprising:
identifying, by the at least one computing device, a song title within the closed captioning data corresponding to the music; and
modifying, by the at least one computing device, the importance level of the moment based at least in part upon the song title.

24. The method of claim 23, further comprising modifying, by the at least one computing device, the importance level of the moment based at least in part upon a popularity of a song corresponding to the song title.

* * * * *

UNITED STATES PATENT AND TRADEMARK OFFICE
CERTIFICATE OF CORRECTION

| | | |
|---|---|---|
| PATENT NO. | : 8,763,023 B1 | Page 1 of 1 |
| APPLICATION NO. | : 13/789718 | |
| DATED | : June 24, 2014 | |
| INVENTOR(S) | : Jeromey Russel Goetz | |

It is certified that error appears in the above-identified patent and that said Letters Patent is hereby corrected as shown below:

In the Claims

Column 12, line 17: replace "wherein the ranks" with --wherein the logic that ranks--

Signed and Sealed this
Twenty-first Day of April, 2015

Michelle K. Lee
*Director of the United States Patent and Trademark Office*